US011956064B2

(12) United States Patent
Tian et al.

(10) Patent No.: US 11,956,064 B2
(45) Date of Patent: *Apr. 9, 2024

(54) MECHANISMS FOR DOPPLER SHIFT INDICATION AND HANDLING

(71) Applicant: Samsung Electronics Co., Ltd., Suwon-si (KR)

(72) Inventors: Shuang Tian, Cupertino, CA (US); Qiaoyang Ye, San Jose, CA (US); Jeongho Jeon, San Jose, CA (US); Joonyoung Cho, Portland, OR (US)

(73) Assignee: Samsung Electronics Co., Ltd., Suwon-si (KR)

( * ) Notice: Subject to any disclaimer, the term of this patent is extended or adjusted under 35 U.S.C. 154(b) by 265 days.

This patent is subject to a terminal disclaimer.

(21) Appl. No.: 17/129,672

(22) Filed: Dec. 21, 2020

(65) Prior Publication Data
US 2022/0069901 A1     Mar. 3, 2022

Related U.S. Application Data

(60) Provisional application No. 63/093,924, filed on Oct. 20, 2020, provisional application No. 63/074,191, filed on Sep. 3, 2020.

(51) Int. Cl.
*H04B 7/185* (2006.01)
*H04L 1/00* (2006.01)
(52) U.S. Cl.
CPC ..... *H04B 7/18513* (2013.01); *H04B 7/18539* (2013.01); *H04B 7/1855* (2013.01); *H04L 1/0004* (2013.01)

(58) Field of Classification Search
None
See application file for complete search history.

(56) References Cited

U.S. PATENT DOCUMENTS

2020/0132859 A1   4/2020   Petrovic et al.
2022/0039037 A1*   2/2022   Tian .................. H04W 36/0055

FOREIGN PATENT DOCUMENTS

WO    2020/074747 A1   4/2020

OTHER PUBLICATIONS

"3rd Generation Partnership Project; Technical Specification Group Radio Access Network; Study on New Radio (NR) to support non-terrestrial networks (Release 15)", 3GPP TR 38.811 V15.2.0, Sep. 2019, 126 pages.

(Continued)

*Primary Examiner* — Willie J Daniel, Jr.

(57) ABSTRACT

Doppler pre-compensated control and data signal(s) generated using first and second Doppler pre-compensation patterns, respectively, are transmitted. A signal indicating the Doppler pre-compensation patterns is transmitted. The Doppler pre-compensated control signals comprise synchronization signals, system information blocks (SIBs), a radio resource control (RRC) message, or a physical downlink control channel (PDCCH), and the Doppler pre-compensated data signals comprise a physical downlink shared channel (PDSCH). The signal indicating the Doppler pre-compensation patterns comprises one of an RRC message or a PDCCH, and may indicate absolute Doppler values or a difference between Doppler values. The PDCCH may indicate a time offset between the PDCCH PDSCH.

20 Claims, 9 Drawing Sheets

(56) References Cited

OTHER PUBLICATIONS

"3rd Generation Partnership Project; Technical Specification Group Radio Access Network; Solutions for NR to support non-terrestrial networks (NTN) (Release 16)", 3GPP TR 38.821 V16.0.0, Dec. 2019, 140 pages.
"3rd Generation Partnership Project; Technical Specification Group Radio Access Network; NR; Physical layer procedures for control (Release 15)", 3GPP TS 38.213 V15.5.0, Mar. 2019, 104 pages.
"3rd Generation Partnership Project; Technical Specification Group Radio Access Network; NR; Physical channels and modulation (Release 16)", 3GPP TS 38.211 V16.1.0, Mar. 2020, 73 pages.
"5G; NR; Radio Resource Control (RRC); Protocol specification (3GPP TS 38.331 version 15.5.1 Release 15)", ETSI TS 138 331 V15.5.1, May 2019, 488 pages.
International Search Report and Written Opinion dated Nov. 29, 2021 regarding International Application No. PCT/KR2021/011890, 7 pages.
MediaTek et al., "UL Time and Frequency Synchronisation for NR-NTN", 3GPP TSG RAN WG1 Meeting #102e, R1-2005496, Aug. 2020, 14 pages.
Thales, "Considerations on UL timing and frequency synchronization", 3GPP TSG RAN WG1 Meeting #102e, R1-2006674, Aug. 2020, 13 pages.
Intel Corporation, "Summary#3 of AI: 8.1.2.4 Enhancements on HST-SFN deployment", 3GPP TSG RAN WG1 Meeting #102e, R1-2007315, Aug. 2020, 43 pages.
Extended European Search Report dated Dec. 18, 2023 regarding Application No. 21864695, 8 pages.
MediaTek Inc., "Other Aspects of NR-NTN", 3GPP TSG RAN WG1 Meeting #102e, R1-2005498, Aug. 2020, 13 page.

\* cited by examiner

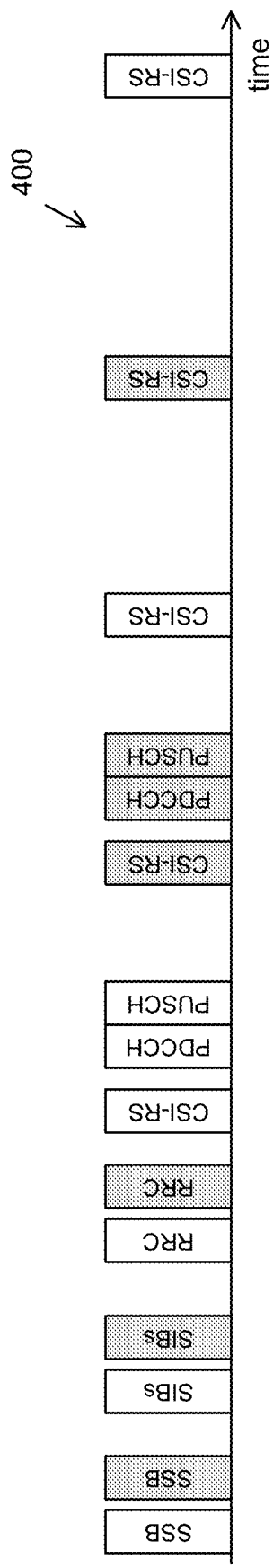
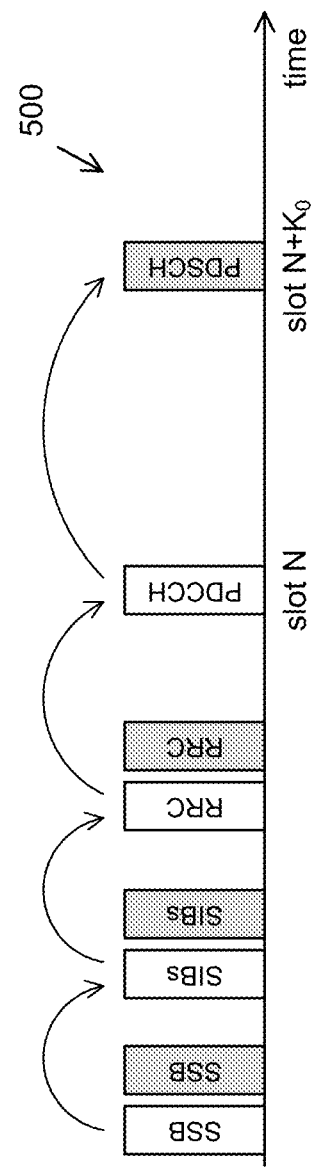
FIG. 4
FIG. 5

MECHANISMS FOR DOPPLER SHIFT INDICATION AND HANDLING

CROSS-REFERENCE TO RELATED APPLICATION AND CLAIM OF PRIORITY

This application claims priority under 35 U.S.C. § 119(e) to U.S. Provisional Patent Application No. 63/074,191 filed Sep. 3, 2020 and U.S. Provisional Patent Application No. 63/093,924 filed Oct. 20, 2020. The above-identified patent document(s) are incorporated herein by reference.

TECHNICAL FIELD

The present disclosure relates generally to Doppler pre-compensation, and more specifically to Doppler pre-compensation for large spot beam/cell size, particularly for different UEs at different radial positions from the center to the periphery of a spot beam/cell.

BACKGROUND

To meet the demand for wireless data traffic having increased since deployment of 4$^{th}$ Generation (4G) or Long Term Evolution (LTE) communication systems and to enable various vertical applications, efforts have been made to develop and deploy an improved 5$^{th}$ Generation (5G) and/or New Radio (NR) or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 giga-Hertz (GHz) or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and technologies associated therewith is for reference as certain embodiments of the present disclosure may be implemented in 5G systems, 6$^{th}$ Generation (6G) systems, or even later releases which may use terahertz (THz) bands. However, the present disclosure is not limited to any particular class of systems or the frequency bands associated therewith, and embodiments of the present disclosure may be utilized in connection with any frequency band. For example, aspects of the present disclosure may also be applied to deployment of 5G communication systems, 6G communications systems, or communications using THz bands.

SUMMARY

A mechanism and electronic devices for multi-value Doppler pre-compensation takes into consideration of a variety of factors, such as spot beam/cell size, Doppler shift seen by the UE, and/or the Doppler shift difference among different UEs inside of a spot beam/cell.

Doppler pre-compensated control and data signal(s) generated using first and second Doppler pre-compensation patterns, respectively, are transmitted. A signal indicating the Doppler pre-compensation patterns is transmitted. The Doppler pre-compensated control signals comprise synchronization signals, system information blocks (SIBs), a radio resource control (RRC) message, or a physical downlink control channel (PDCCH), and the Doppler pre-compensated data signals comprise a physical downlink shared channel (PDSCH). The signal indicating the Doppler pre-compensation patterns comprises one of an RRC message or a PDCCH, and may indicate absolute Doppler values or a difference between Doppler values. The PDCCH may indicate a time offset between the PDCCH and PDSCH.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 4 illustrates an exemplary scheduling operation of 2-value Doppler pre-compensation according to embodiments of the present disclosure;

FIG. 5 illustrates an exemplary scheduling operation of 2-value Doppler pre-compensation according to embodiments of the present disclosure;

DETAILED DESCRIPTION

Figure 1:
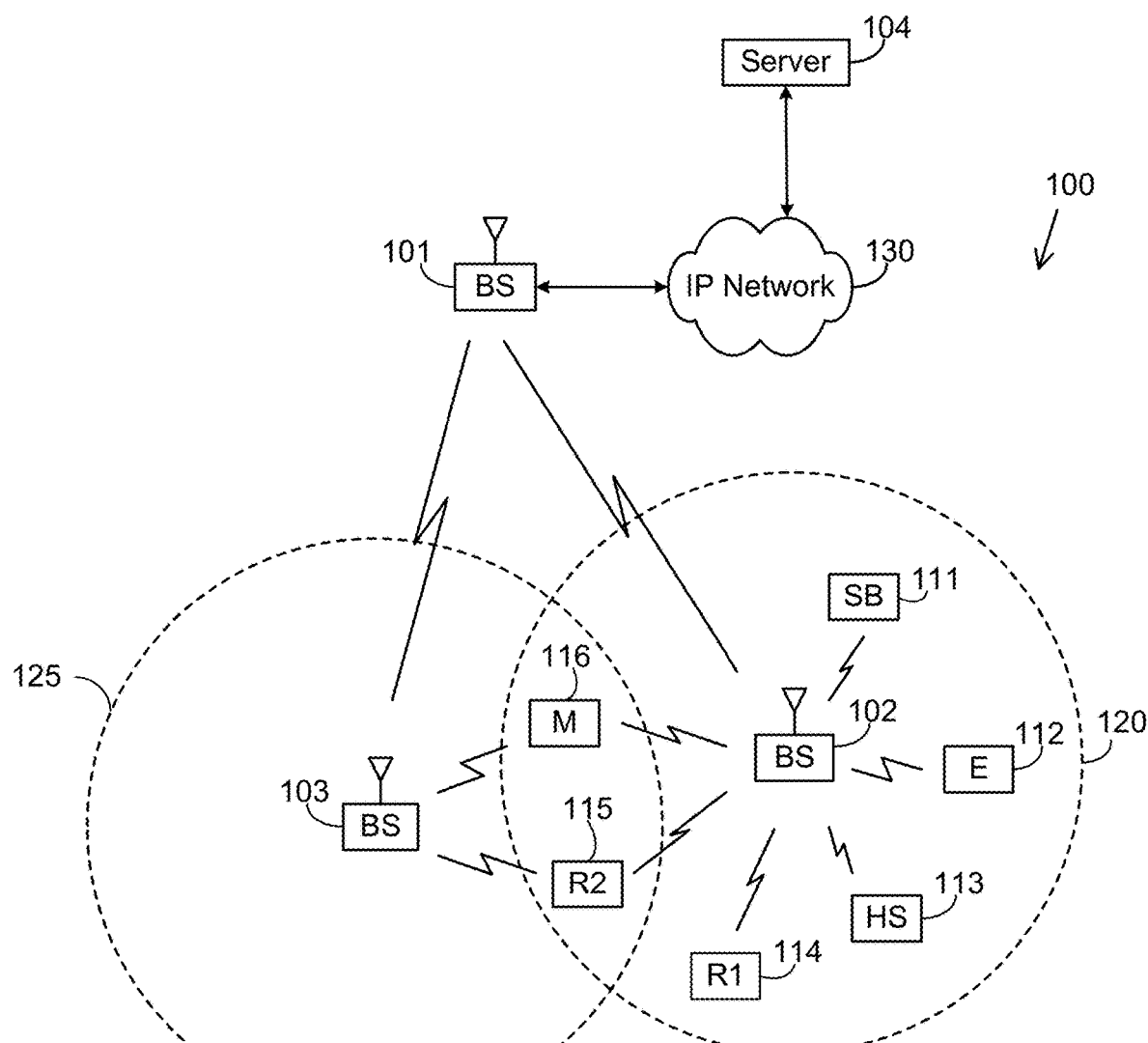
FIG. 1 illustrates an exemplary networked system according to various embodiments of this disclosure.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

REFERENCES

[1] 3GPP, TR 38.811, Study on New Radio (NR) to support non-terrestrial networks, v15.2.0, September 2019.

[2] 3GPP, TR 38.821, Solutions for NR to support non-terrestrial networks (NTN), v16.0.0, December 2019.

[3] 3GPP, TS 38.213, NR: Physical layer procedures for control, v15.5.0, March 2019.

[4] 3GPP, TS 38.211, NR: Physical channels and modulation, v16.1.0, March 2020.

[5] 3GPP, TS 38.331, NR: Radio Resource Control (RRC) protocol specification, v15.5.1, April 2019.

The above-identified references are incorporated herein by reference.

Abbreviations

THz Terahertz
CFO carrier frequency offset
CSI-RS channel state information reference signal
FO frequency offset
BS base station
UE user equipment
NTN non-terrestrial networks
NR New Radio
LEO low earth orbits
LTE Long Term Evolution
3GPP 3rd Generation Partnership Project
PSS primary synchronization signal
SSS secondary synchronization signal
PBCH physical broadcast channel
SSB synchronization signal block
PAPR peak to average power ratio
FR frequency range
SFN system frame number
RSRP reference signal received power
PDCCH physical downlink control channel
PDSCH physical downlink shared channel Doppler Effect in Non-Terrestrial Networks Non-terrestrial networks (NTN) refer to networks that comprise airborne or spaceborne vehicle for transmission. Airborne vehicles include high altitude platforms, such as unmanned aircraft systems (UAS), operating at altitude between 8 and 50 kilometers (km). Spaceborne vehicles include satellites operating at low earth orbits (LEO), medium earth orbits (MEO), geostationary earth orbit (GEO), or in highly elliptical orbits (HEO). Non-terrestrial networks are important components for the fifth generation (5G) mobile communications system to increase coverage and availability in areas with no, or limited, terrestrial networks' services, such as scenarios of high speed trains, ships and aircraft [1], [2]. Doppler effect (or the Doppler shift) is in general not a factor in geostationary satellite systems because the GEO satellite is almost quasi static with respect to the UE on the earth, with only a small Doppler shift. However, Doppler shift is significant in LEO satellite systems due to the LEO satellite's very high speed relative to the earth's surface, which causes very large divergence of the received signals from the original frequencies and wavelengths.

Conventional Doppler Handling Techniques in LEO Systems

Conventionally, the very large Doppler shift caused by LEO satellite movement can be pre-compensated by the transmission equipment. Given the knowledge of satellite ephemeris and the satellite's spot beam location on the earth, the downlink signals transmitted from the satellite could be pre-compensated by the Doppler shift value targeting the center of the spot beam on the earth. The aim of this beam-center-targeting pre-compensation tries to limit the frequency offsets, including Doppler shifts for different UEs inside of a spot beam on the earth, to those within the UE's capability to handle. However, in case of large spot beam size (or diameter), the beam-center-targeting single-value Doppler pre-compensation would not be able to reduce the Doppler shifts sufficiently to be handled by UEs that are close to the edge of the spot beam (or cell).

This motivates use, as described in this disclosure, of a multi-value Doppler pre-compensation mechanism by taking into consideration of factors, such as spot beam/cell size, Doppler shift seen by the UE, and/or the Doppler shift difference among different UEs inside of a spot beam/cell. Multi-value Doppler pre-compensation according to this disclosure takes into consideration a variety of factors, such as spot beam/cell size, Doppler shift seen by the UE, and/or the Doppler shift difference among different UEs inside of a spot beam/cell. The BS/satellite may transmit different sets of synchronization signal blocks (SSB) applying different values of Doppler shifts for pre-compensation, targeting different parts of a spot beam/cell. The UEs in different parts of the spot beam/cell will be able to get access and connected to the network through a designated set of SSBs.

The multi-value Doppler pre-compensation may be performed in either frequency domain or time domain. For frequency domain pre-compensation, different Doppler shift values may be applied to different sets of physical resource blocks that are scheduled for different UEs at the same time. Frequency domain pre-compensation may require large guard bands resulting in lower system capacity. For time domain pre-compensation, different Doppler shift values may be applied in time division manner for pre-compensation, while the full bandwidth capacity may be achieved.

This disclosure relates to a mechanism and electronic devices for multi-value Doppler pre-compensation taking into consideration of factors, such as spot beam/cell size, Doppler shift seen by the UE, and/or the Doppler shift difference among different UEs inside of a spot beam/cell. The BS/satellite may transmit different sets of synchronization signal blocks (SSB) applying different values of Doppler shifts for pre-compensation, targeting different parts of a spot beam/cell. In addition, the BS/satellite may also apply different values of Doppler shifts for pre-compensation to the system information blocks, e.g., a master information block (MIB) and system information blocks (SIBs), radio resource control (RRC) message, channel state information reference signal (CSI-RS), physical downlink control channel (PDCCH) and physical downlink shared channel (PDSCH). At the UE side, the UEs in different parts of the spot beam/cell may be able to get access and connected to the network through different sets of downlink transmissions associated with different values of Doppler shifts for pre-compensation.

FIG. 1 illustrates an exemplary networked system according to various embodiments of this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station (BS) 101, a BS 102, and a BS 103. The BS 101 communicates with the BS 102 and the BS 103. The BS 101 also communicates with at least one Internet protocol (IP) network 130, such as the Internet, a proprietary IP network, or another data network.

The BS 102 provides wireless broadband access to the network 130 for a first plurality of user equipments (UEs) within a coverage area 120 of the BS 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R1); a UE 115, which may be located in a second residence (R2); and a UE 116, which may be a mobile device (M) like a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G, LTE, LTE Advanced (LTE-A), WiMAX, WiFi, or other wireless communication techniques.

Depending on the network type, other well-known terms may be used instead of "base station" or "BS," such as node B, evolved node B ("eNodeB" or "eNB"), a 5G node B ("gNodeB" or "gNB") or "access point." For the sake of convenience, the terms "base station" and/or "BS" are used in this disclosure to refer to network infrastructure components that provide wireless access to remote terminals. Also, depending on the network type, other well-known terms may be used instead of "user equipment" or "UE," such as "mobile station" (or "MS"), "subscriber station" (or "SS"), "remote terminal," "wireless terminal," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extent of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

Although FIG. 1 illustrates one example of a wireless network 100, various changes may be made to FIG. 1. For example, the wireless network 100 could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BS 101, 102, and/or 103 could provide access to other or additional external networks, such as external telephone networks or other types of data networks.

Figure 2:
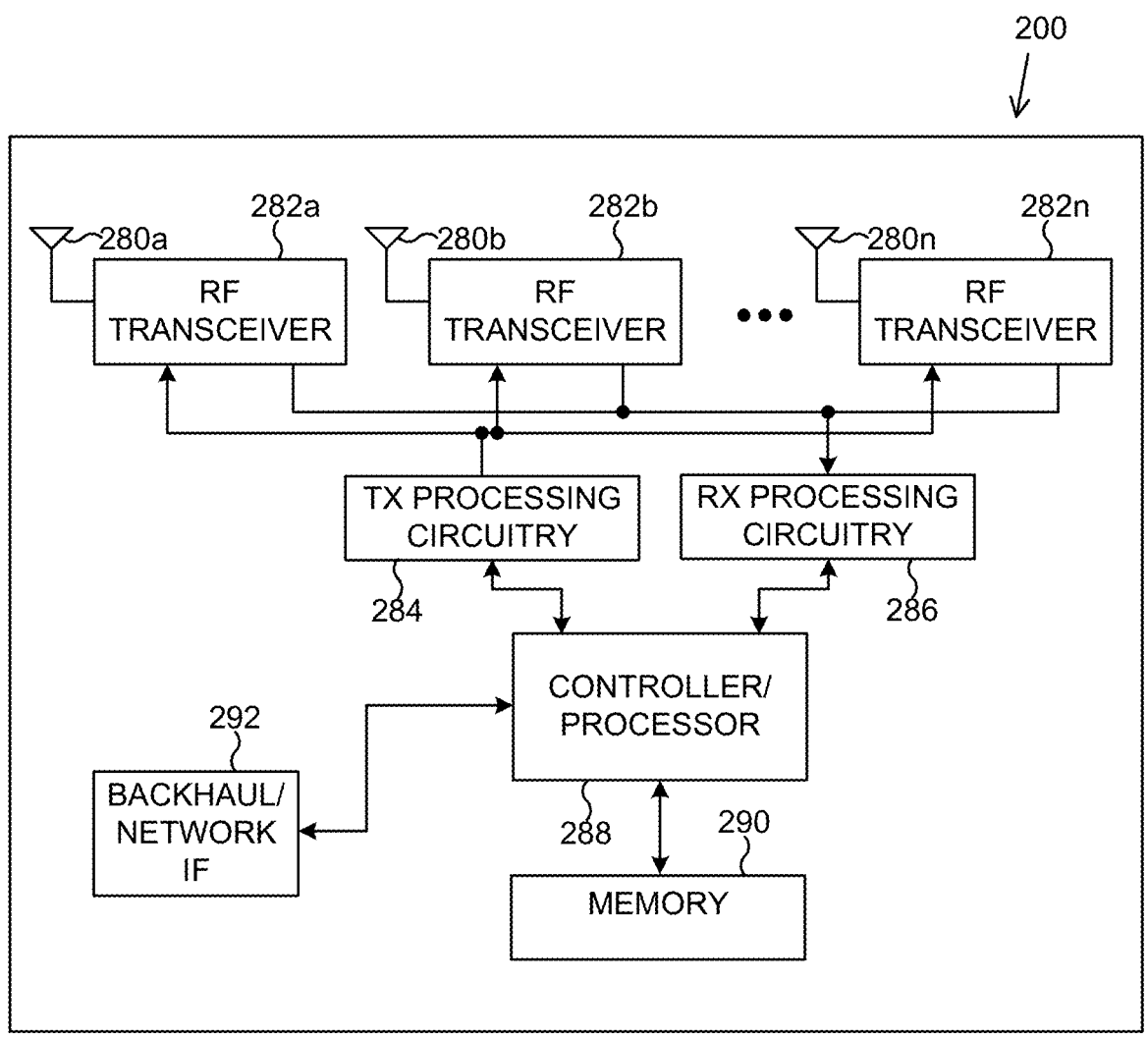
FIG. 2 illustrates an exemplary base station (BS) according to various embodiments of this disclosure.

FIG. 2 illustrates an exemplary base station (BS) according to various embodiments of this disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 280a-280n, multiple radio frequency (RF) transceivers 282a-282n, transmit (TX or Tx) processing circuitry 284, and receive (RX or Rx) processing circuitry 286. The BS 102 also includes a controller/processor 288, a memory 290, and a backhaul or network interface 292.

The RF transceivers 282a-282n receive, from the antennas 280a-280n, incoming RF signals, such as signals transmitted by UEs in the network 100. The RF transceivers 282a-282n down-convert the incoming RF signals to generate IF or baseband signals. The IF or baseband signals are sent to the RX processing circuitry 286, which generates processed baseband signals by filtering, decoding, and/or digitizing the baseband or IF signals. The RX processing circuitry 286 transmits the processed baseband signals to the controller/processor 288 for further processing.

The TX processing circuitry 284 receives analog or digital data (such as voice data, web data, e-mail, or interactive video game data) from the controller/processor 288. The TX processing circuitry 284 encodes, multiplexes, and/or digitizes the outgoing baseband data to generate processed baseband or IF signals. The RF transceivers 282a-282n receive the outgoing processed baseband or IF signals from the TX processing circuitry 284 and up-converts the baseband or IF signals to RF signals that are transmitted via the antennas 280a-280n.

The controller/processor 288 can include one or more processors or other processing devices that control the overall operation of the BS 102. For example, the controller/processor 288 could control the reception of forward channel signals and the transmission of reverse channel signals by the RF transceivers 282a-282n, the RX processing circuitry 286, and the TX processing circuitry 284 in accordance with well-known principles. The controller/processor 288 could support additional functions as well, such as more advanced wireless communication functions and/or processes described in further detail below. For instance, the controller/processor 288 could support beam forming or directional routing operations in which outgoing signals from multiple antennas 280a-280n are weighted differently to effectively steer the outgoing signals in a desired direction. Any of a wide variety of other functions could be supported in the BS 102 by the controller/processor 288. In some embodiments, the controller/processor 288 includes at least one microprocessor or microcontroller.

The controller/processor 288 is also capable of executing programs and other processes resident in the memory 290, such as a basic operating system (OS). The controller/processor 288 can move data into or out of the memory 290 as required by an executing process.

The controller/processor 288 is also coupled to the backhaul or network interface 292. The backhaul or network interface 292 allows the BS 102 to communicate with other devices or systems over a backhaul connection or over a network. The interface 292 could support communications over any suitable wired or wireless connection(s). For example, when the BS 102 is implemented as part of a cellular communication system (such as one supporting 6G, 5G, LTE, or LTE-A), the interface 292 could allow the BS 102 to communicate with other BSs over a wired or wireless backhaul connection. When the BS 102 is implemented as an access point, the interface 292 could allow the BS 102 to communicate over a wired or wireless local area network or over a wired or wireless connection to a larger network (such as the Internet). The interface 292 includes any suitable structure supporting communications over a wired or wireless connection, such as an Ethernet or RF transceiver.

The memory 290 is coupled to the controller/processor 288. Part of the memory 290 could include a RAM, and another part of the memory 290 could include a Flash memory or other ROM.

As described in more detail below, base stations in a networked computing system can be assigned as synchronization source BS or a slave BS based on interference relationships with other neighboring BSs. In some embodiments, the assignment can be provided by a shared spectrum manager. In other embodiments, the assignment can be agreed upon by the BSs in the networked computing system. Synchronization source BSs transmit OSS to slave BSs for establishing transmission timing of the slave BSs.

Although FIG. 2 illustrates one example of BS 102, various changes may be made to FIG. 2. For example, the BS 102 could include any number of each component shown in FIG. 2. As a particular example, an access point could include a number of interfaces 292, and the controller/processor 288 could support routing functions to route data between different network addresses. As another particular example, while shown as including a single instance of TX processing circuitry 284 and a single instance of RX processing circuitry 286, the gNB 102 could include multiple instances of each (such as one per RF transceiver). Also, various components in FIG. 2 could be combined, further subdivided, or omitted and additional components could be added according to particular needs.

Figure 3:
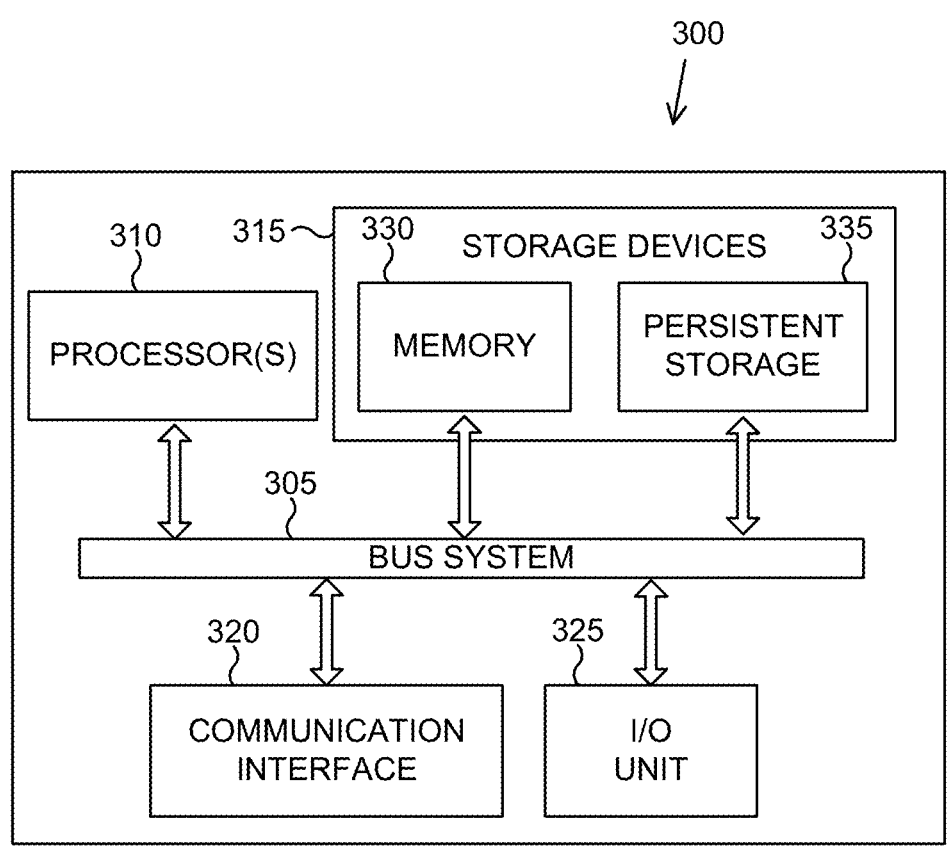
FIG. 3 illustrates an exemplary electronic device for communicating in the networked computing system according to various embodiments of this disclosure.

FIG. 3 illustrates an exemplary electronic device for communicating in the networked computing system according to various embodiments of this disclosure. In one embodiment, the electronic device 300 is a user equipment implemented as a mobile device, which can represent one of the UEs in FIG. 1.

As shown in FIG. 3, the electronic device 300 includes a bus system 305, which supports communication between at least one processing device 310, at least one storage device 315, at least one communications unit 320, and at least one input/output (I/O) unit 325.

The processing device 310 executes instructions that may be loaded into a memory 330. The processing device 310 may include any suitable number(s) and type(s) of processors or other devices in any suitable arrangement. Example types of processing devices 310 include microprocessors, microcontrollers, digital signal processors, field programmable gate arrays, application specific integrated circuits, and discreet circuitry.

The memory 330 and a persistent storage 335 are examples of storage devices 315, which represent any structure(s) capable of storing and facilitating retrieval of information (such as data, program code, and/or other suitable information on a temporary or permanent basis). The memory 330 may represent a random access memory or any other suitable volatile or non-volatile storage device(s). The persistent storage 335 may contain one or more components or devices supporting longer-term storage of data, such as a ready only memory, hard drive, Flash memory, or optical disc.

The communications unit 320 supports communications with other systems or devices. For example, the communications unit 320 could include a network interface card or a wireless transceiver facilitating communications over the network 130. The communications unit 320 may support communications through any suitable physical or wireless communication link(s).

The I/O unit 325 allows for input and output of data. For example, the I/O unit 325 may provide a connection for user input through a keyboard, mouse, keypad, touchscreen, or other suitable input device. The I/O unit 325 may also send output to a display, printer, or other suitable output device.

As described in more detail below, the electronic device 300 can serve as a shared spectrum manager in a networked computing system can generate synchronization source/slave assignments and configure synchronization signals.

Although FIG. 3 illustrates an example of an electronic device 300 in a wireless system including a plurality of base stations, such as base stations 101, 102, and 103 in FIG. 1, various changes may be made to FIG. 3. For example, various components in FIG. 3 can be combined, further subdivided, or omitted and additional components could be added according to particular needs. In addition, as with computing and communication networks, servers can come in a wide variety of configurations, and FIG. 3 does not limit this disclosure to any particular electronic device.

One embodiment relates to operation of multi-value Doppler pre-compensation in a LEO satellite system, although the operation may also be applied to other wireless communication systems such as for communicating with UEs in high-speed train. It should not be interpreted as a limiting factor of the scope of this disclosure. This embodiment of multi-value Doppler pre-compensation in the LEO satellite system includes operations for downlink data reception for UEs in a connected state.

Multi-Value Doppler Pre-Compensation for Connected UE Data Channel Reception

FIG. 4 illustrates an exemplary scheduling operation of 2-value Doppler pre-compensation according to embodiments of the present disclosure. The example 400 depicted in FIG. 4 is for illustration only. Other embodiments could be used without departing from the scope of this disclosure.

In case of multi-value Doppler pre-compensation, where different sets of SSBs are pre-compensated by different Doppler shift values, for the system information blocks (e.g., MIB and SIBs), RRC messages, PDCCHs, PDSCHs and downlink reference signals, such as CSI-RSs, the BS may apply the different values of Doppler shifts for pre-compensation, as shown in the example of FIG. 4. At the UE side, the UEs in different parts of the spot beam/cell may be able to obtain access and connected to the network through different sets of downlink transmission associated with different values of Doppler shifts for pre-compensation.

FIG. 4 illustrates a diagram for an exemplary 2-value Doppler pre-compensation and its scheduling operation including SSB, SIBs, RRC messages, CSI-RSs, PDCCHs and PDSCHs. For the two Doppler shift values for pre-compensation, namely "Doppler-value 1" and "Doppler-value 2":

The OFDM symbols for DL transmission may be divided into two Doppler pre-compensation groups in time division manner: Group 1 (white blocks) are pre-compensated by "Doppler-value 1"; and Group 2 (shaded blocks) are pre-compensated by "Doppler-value 2".

UEs, such as UEs in connected mode that get synchronized and access to the network through "SSBs with Doppler-value 1", may be scheduled by the BS in Group 1 for DL transmission, including RRC messages, PDCCHs, PDSCHs and other DL reference signals, such as CSI-RS. In addition, UEs may tune its local oscillator according to the FO estimation based on "SSBs with Doppler-value 1", and then keep tracking the FO changes based on other DL reference signals, such as CSI-RS.

In case of different DL reference signals and channels to be scheduled in the same OFDM symbols, for example, SSB/PDSCH/CSI-RS/DMRS/PDCCH, they need to be in the same Doppler pre-compensation group.

The scheduling operation in FIG. 4 enables UEs in connected state to be scheduled for DL reception of OFDM symbols in either Group 1 (white blocks) or Group 2 (shaded blocks). In addition, the BS/satellite may apply different pre-compensation values of Doppler shifts to different downlink reference signals and/or control/data channels, which are associated with one UE. It enables a UE that gets synchronized and access to the network through, for example, Group 1 to be switched to Group 2 for DL reception. One example scenario is to facilitate UE grouping flexibility.

FIG. 5 illustrates an exemplary scheduling operation of 2-value Doppler pre-compensation according to embodiments of the present disclosure. The example 500 depicted in FIG. 5 is for illustration only. Other embodiments could be used without departing from the scope of this disclosure.

FIG. 5 illustrates a diagram for an exemplary 2-value Doppler pre-compensation and its scheduling operation, where a UE may synchronize and gain access to the network through detection and decoding of SSBs, SIBs and RRC messages that are broadcast by the BS and have been pre-compensated by "Doppler-value 1" (white blocks). Then, in slot N, the BS transmits the PDCCH, which is also pre-compensated by "Doppler-value 1," to the UE. There is a slot or symbol level time offset between the downlink control indicator (DCI) carried by the PDCCH and the associated scheduled PDSCH. This time offset may be a pre-defined value and/or be indicated by the BS to the UE. The BS may apply a different Doppler value from "Doppler-value 1," such as "Doppler-value 2," to PDSCH for pre-compensation. In addition, the information may be included in DCI to indicate the values in frequency of "Doppler-value 1" for PDCCH and "Doppler-value 2" for PDSCH, respectively, or the relative frequency difference between "Doppler-value 1" for PDCCH and "Doppler-value 2" for PDSCH. The UE may use this information for PDSCH demodulation and decoding. For example, the UE may tune the frequency point of its local oscillator for PDSCH reception.

Figure 6:
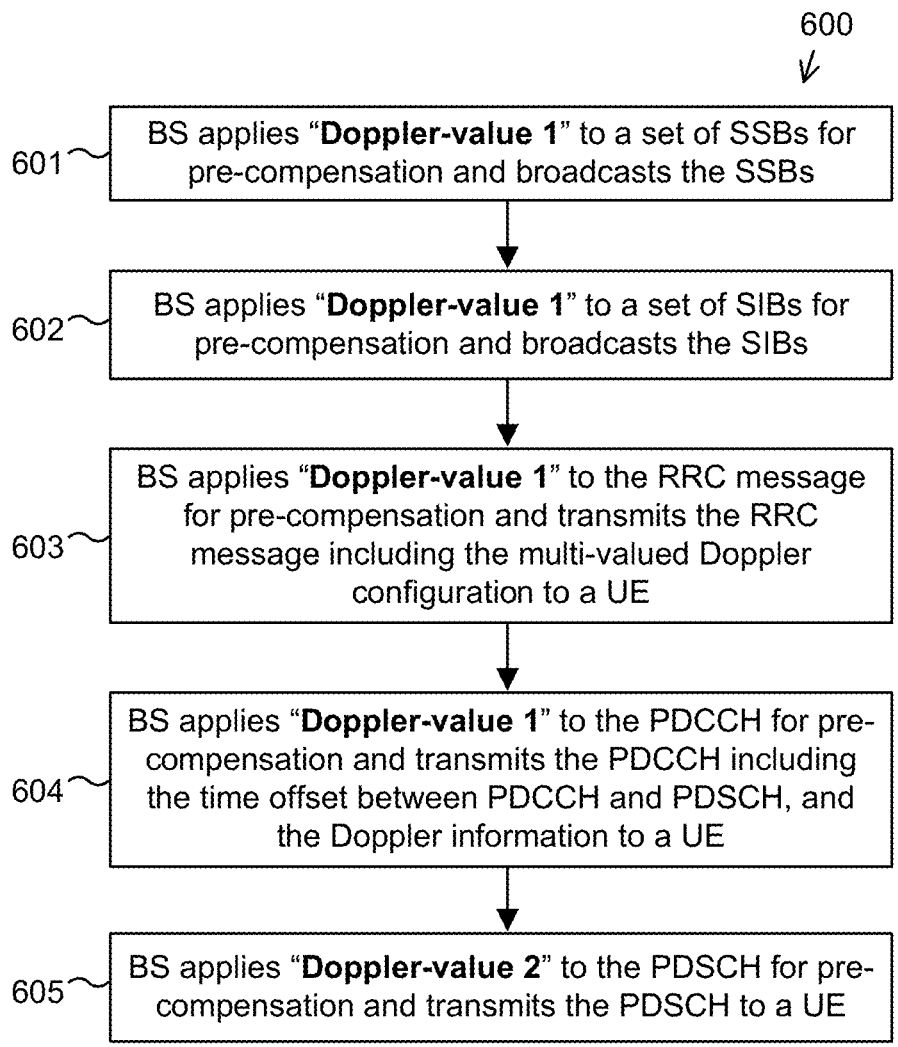
FIG. 6 illustrates a flowchart for an example of BS operations according to embodiments of the present disclosure.

FIG. 6 illustrates a flowchart for an example of BS operations according to embodiments of the present disclosure. The example 600 depicted in FIG. 6 is for illustration only. Other embodiments could be used without departing from the scope of this disclosure.

FIG. 6 illustrates an exemplary operation flow 600 at the BS and the BS's transmission to the UE. At operation 601, the BS, for example the LEO satellite, may apply one frequency value of Doppler shift, e.g., "Doppler-value 1," for pre-compensation to a set of SSB transmission. At operation 602, the BS applies the same value of Doppler shift, e.g., "Doppler-value 1," for pre-compensation to a set of SIB transmissions. At operation 603, the BS applies the same value of Doppler shift, e.g., "Doppler-value 1," for pre-compensation to the RRC message and transmits the pre-compensated RRC message to a UE. At operation 604, the BS applies the same value of Doppler shift, e.g., "Doppler-value 1," for pre-compensation to the PDCCH and transmits the pre-compensated PDCCH to a UE. At operation 605, the BS applies a different value of Doppler shift, e.g., "Doppler-value 2," for pre-compensation to the PDSCH and transmits the pre-compensated PDSCH to a UE.

At operation 603, the RRC message may contain a list of multi-valued Doppler configurations, and each Doppler value "Doppler-DownlinkValue" in Hertz is associated with one Doppler identification (Id) "Doppler-Id." One configuration example in the RRC message defined using Abstract Syntax Notation One (ASN.1) is given below:

{ . . .
    downlinkDoppler-ToAddModList SEQUENCE (SIZE
        (1 . . . maxNrofDoppler)) OF Doppler-Downlink
        OPTIONAL
. . . }

Doppler-Downlink::=SEQUENCE {
Doppler-Id Doppler-Id,
Doppler-Value Doppler-DownlinkValue
. . .
}

At operation 604, the PDCCH carries a DCI, which may contain the Doppler information for PDCCH and PDSCH pre-compensation, respectively. For example, the DCI may provide an m-bit index/indicator for Doppler-Id associated with the "Doppler-DownlinkValue" that was applied to the PDCCH transmission, and may provide another index/indicator for the "Doppler-Id" associated with the "Doppler-DownlinkValue" that was applied to the PDSCH transmission.

Alternatively, at operation 604, the BS may indicate the frequency difference in Hertz between Doppler shift values used for PDCCH and PDSCH pre-compensation. For example, the DCI may provide one m-bit index/indicator for "Doppler-Id" associated with the "Doppler-DownlinkValue." Upon reception of the PDCCH, the UE may tune the frequency point of the UE's local oscillator for PDSCH reception according to the frequency difference information.

Figure 7:
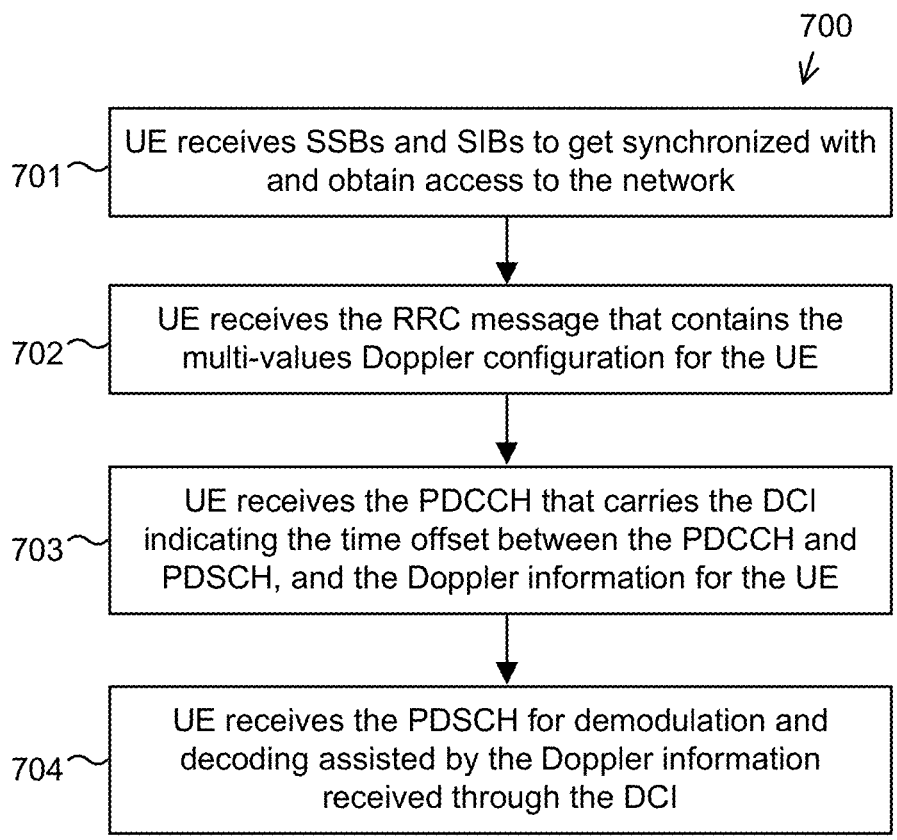
FIG. 7 illustrates a flowchart for an example of UE operations according to embodiments of the present disclosure.

FIG. 7 illustrates a flowchart for an example of UE operations according to embodiments of the present disclosure. The example 700 depicted in FIG. 7 is for illustration only. Other embodiments could be used without departing from the scope of this disclosure.

FIG. 7 illustrates an exemplary operation flow 700 at the UE. At operation 701, the UE receives the SSBs and SIBs for detection, demodulation and decoding to get synchronized with and obtain access to the network. At operation 702, the UE receives the RRC message that contains the multi-valued Doppler configuration for the UE, as described in operation 603. At operation 703, the UE receives the DCI carried by the PDCCH that contains the Doppler information for PDCCH and PDSCH pre-compensation, respectively, as described in operation 604. In addition, the time offset between PDCCH and PDSCH transmission may also be indicated by the DCI, for the UE to prepare for PDSCH reception. At operation 704, the UE receives the PDSCH for demodulation and decoding, assisted by the Doppler information provided by the DCI. For example, the UE may tune the frequency point of the UE's local oscillator for PDSCH reception.

Multi-Value Doppler Pre-Compensation for DL Control Channel Monitoring

In case of multi-value Doppler pre-compensation, in order to enable the UE to detect, demodulate and decode the PDCCH in almost any DL slot, a Doppler pre-compensation pattern for PDCCH transmission may be indicated from the BS to the UEs. This information may be broadcast by system information blocks, such as the MIB and SIBS, and/or be transmitted through an RRC message.

Figure 8:
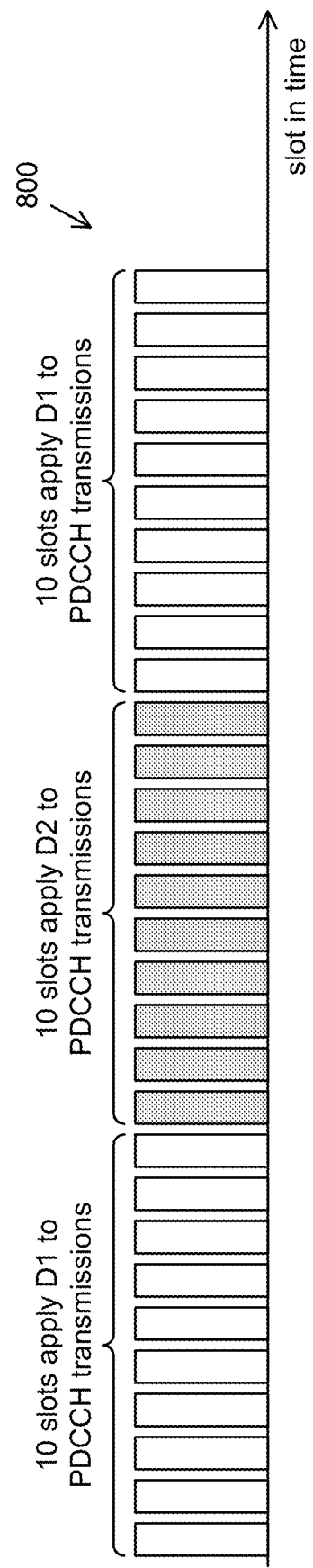
FIG. 8 illustrates an exemplary scheduling operation of 2-value Doppler pre-compensation according to embodiments of the present disclosure.

FIG. 8 illustrates an exemplary scheduling operation of 2-value Doppler pre-compensation according to embodiments of the present disclosure. The example 800 depicted in FIG. 8 is for illustration only. Other embodiments could be used without departing from the scope of this disclosure.

FIG. 8 illustrates a diagram for an exemplary 2-value Doppler pre-compensation pattern, e.g., D1 and D2, that may be broadcast by the BS to the UEs. FIG. 8 shows that there is a 10-slot periodicity. For example, if a PDCCH is to be transmitted in any one of the first 10 slots in FIG. 8, the same Doppler pre-compensation value "D1" will be applied for the PDCCH transmissions. Given a UE is aware of the Doppler value for pre-compensation applied to the PDCCH, as described at operation 703, the UE may be able to tune the frequency point of the UE's local oscillator for PDCCH monitoring in any available DL slot.

Figure 9:
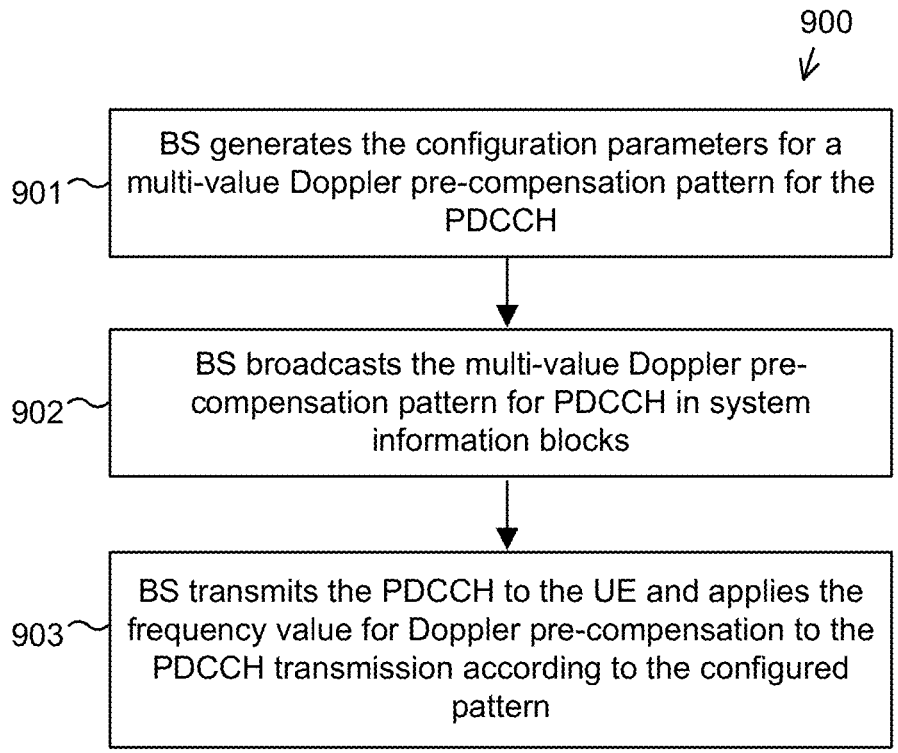
FIG. 9 illustrates a flowchart for an example of BS operations according to embodiments of the present disclosure.

FIG. 9 illustrates a flowchart for an example of BS operations according to embodiments of the present disclosure. The example 900 depicted in FIG. 9 is for illustration only. Other embodiments could be used without departing from the scope of this disclosure.

FIG. 9 illustrates an exemplary operation flow 900 at the BS and the BS's transmissions to the UE. At operation 901, the BS, for example the LEO satellite, may generate the configuration parameters for the multi-value Doppler pre-compensation pattern for PDCCH transmissions. At operation 902, the BS broadcasts the system information blocks that may contain the parameters for the multi-value Doppler pre-compensation pattern for the PDCCH transmissions. At operation 903, the BS transmits the PDCCH to the UE and applies the frequency value for Doppler pre-compensation to the PDCCH transmission according to the configured pattern.

At operation 902, the system information blocks, including the MIB and/or SIBs, may contain the configuration parameters to indicate the multi-value Doppler pre-compensation pattern for PDCCH transmission. One configuration example in SIB 1 is given below (emphasis added):

SIB1:
ServingCellConfigCommonSIB::=SEQUENCE {
  downlinkConfigCommon  DownlinkConfigCommon-SIB,
  uplinkConfigCommon UplinkConfigCommonSIB
OPTIONAL, -- Need R
  supplementaryUplink UplinkConfigCommonSIB
OPTIONAL, -- Need R
  n-TimingAdvanceOffset    ENUMERATED  {n0, n25560, n39936}
OPTIONAL, -- Need S
  ssb-PositionsInBurst SEQUENCE {
    inOneGroup BIT STRING (SIZE (8)),
    groupPresence BIT STRING (SIZE (8))
OPTIONAL Cond Above6GHzOnly
  },
  ssb-PeriodicityServingCell  ENUMERATED  {ms5, ms10, ms20, ms40, ms80, ms160},
  PDCCH-MultiDoppler BOOLEAN
OPTIONAL, -- Need R
  PDCCH-NrofDopplerShift INTEGER (1 . . . maxNrofDopplerShift)
OPTIONAL, -- Need R
  PDCCH-Doppler-Value Doppler-DownlinkValue
OPTIONAL, -- Need R
  PDCCH-NrofIdenticalDoppler INTEGER (1 . . . maxNrofIdenticalDoppler)
OPTIONAL, -- Need R
  PDCCH-MultiDopplerStart INTEGER (1 . . . maxNrofSlotsPerFrame)
OPTIONAL, -- Need R
  tdd-UL-DL-ConfigurationCommon    TDD-UL-DL-ConfigCommon
OPTIONAL, -- Cond TDD
  ss-PBCH-BlockPower INTEGER (-60 . . . 50),
. . .
} where "PDCCH-MultiDoppler" indicates if PDCCH transmission is pre-compensated by multiple Doppler values, "PDCCH-NrofDopplerShift" indicates the number of Doppler values that may be used for pre-compensation, "PDCCH-Doppler-Value" provides the value in Hertz associated with each Doppler value, "PDCCH-NrofIdentical- Doppler" indicates the number of continuous slots that would apply the same Doppler value for pre-compensation, and "PDCCH-MultiDopplerStart" indicates the start position or boundary in slot for one Doppler value to be applied for pre-compensation to PDCCH transmission.

Figure 10:
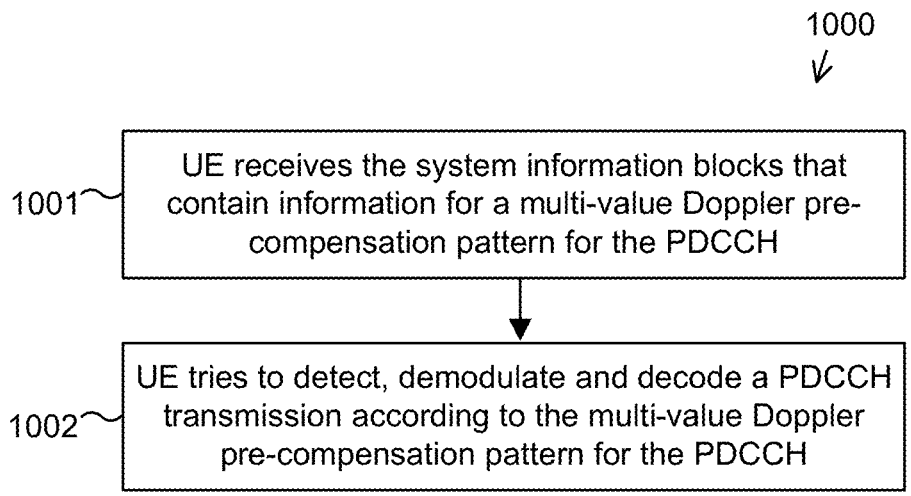
FIG. 10 illustrates a flowchart for an example of UE operations according to embodiments of the present disclosure.

FIG. 10 illustrates a flowchart for an example of UE operations according to embodiments of the present disclosure. The example 1000 depicted in FIG. 10 is for illustration only. Other embodiments could be used without departing from the scope of this disclosure.

FIG. 10 illustrates an exemplary operation flow 1000 at the UE. At operation 1001, the UE receives the system information blocks, such as the MIB and/or SIBS, that may contain the configuration parameters to indicate the multi-value Doppler pre-compensation pattern for PDCCH transmissions. At operation 1002, the UE may try to detect, demodulate and decode the PDCCH transmission according to the multi-value Doppler pre-compensation pattern for PDCCH transmissions. In addition, the UE may be assisted by the Doppler information received through the DCI as described at operation 703.

Figure 11:
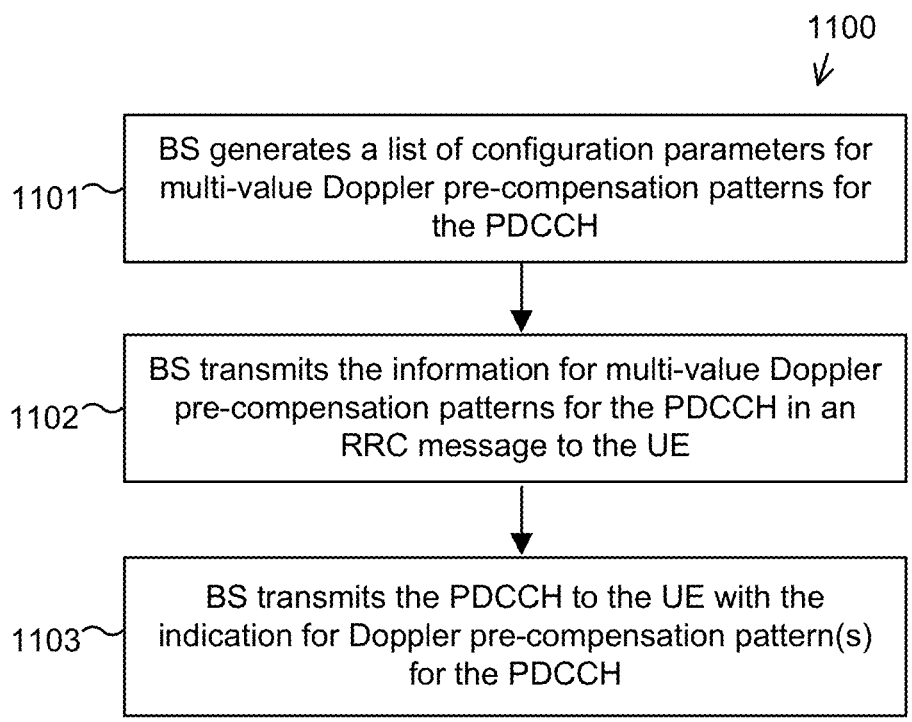
FIG. 11 illustrates a flowchart for an example of BS operations according to embodiments of the present disclosure.

FIG. 11 illustrates a flowchart for an example of BS operations according to embodiments of the present disclosure. The example 1100 depicted in FIG. 11 is for illustration only. Other embodiments could be used without departing from the scope of this disclosure.

FIG. 11 illustrates an exemplary operation flow 1100 at the BS and its transmission to the UE. At operation 1101, the BS, for example the LEO satellite, may generates a list of configuration parameters for the multi-value Doppler pre-compensation patterns for PDCCH transmission. At operation 1102, BS broadcasts the information for the multi-value Doppler pre-compensation patterns for PDCCH in RRC message to the UE. At operation 1103, BS transmits the PDCCH to the UE with the indication for the Doppler pre-compensation pattern for PDCCH transmission.

At operation 1102, the RRC message may contain a list of configuration parameters for the multi-value Doppler pre-compensation patterns for PDCCH transmission. One configuration example in RRC message is given below (emphasis added):

RRC Message:

```
{ . . .
downlinkPDCCHDoppler-ToAddModList   SEQUENCE
    (SIZE
    (1 . . . maxNrofDoppler)) OF Doppler-Downlink
    OPTIONAL
. . . }
Doppler-Downlink::=SEQUENCE {
    PDCCH-MultiDoppler BOOLEAN
    OPTIONAL, -- Need R
    PDCCH-Doppler-Id Doppler-Id,
    OPTIONAL, -- Need R
    PDCCH-Doppler-Value Doppler-DownlinkValue
    OPTIONAL, -- Need R
    PDCCH-NrofDopplerShift INTEGER (1 . . . maxN-
        rofDopplerShift)
    OPTIONAL, -- Need R
    PDCCH-NrofIdenticalDoppler INTEGER (1 . . .
        maxNrofIdenticalDoppler)
    OPTIONAL, -- Need R
    PDCCH-MultiDopplerStart INTEGER (1 . . . maxN-
        rofSlotsPerFrame)
    OPTIONAL, -- Need R
    . . .
}
``` where each Doppler pre-compensation pattern is associated with a "Doppler-Id." At operation 1102, the BS may send an n-bit "Doppler-Id" to the UE to indicate the multi-value Doppler pre-compensation pattern(s) for PDCCH transmissions. These operations enable the multi-value Doppler pre-compensation patterns for PDCCH transmission to be dynamically modified and updated.

Figure 12:
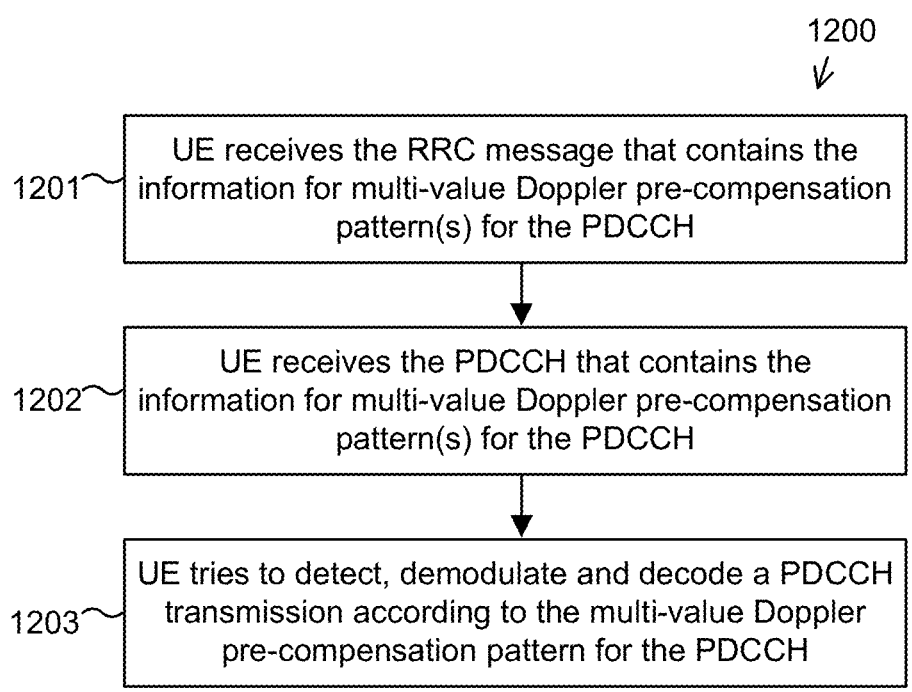
FIG. 12 illustrates a flowchart for an example of UE operations according to embodiments of the present disclosure.

FIG. 12 illustrates a flowchart for an example of UE operations according to embodiments of the present disclosure. The example 1200 depicted in FIG. 12 is for illustration only. Other embodiments could be used without departing from the scope of this disclosure.

FIG. 12 illustrates an exemplary operation flow 1200 at the UE. At operation 1201, the UE receives the RRC message that may contain a list of configuration parameters for the multi-value Doppler pre-compensation patterns for PDCCH transmissions. At operation 1202, the UE receives the PDCCH that carries the DCI indicating the multi-value Doppler pre-compensation pattern(s) for PDCCH transmissions. At operation 1203, the UE may try to detect, demodulate and decode the PDCCH transmission according to information from the DCI for the multi-value Doppler pre-compensation pattern for PDCCH transmissions. In addition, the UE may be assisted by the Doppler information received through the DCI as described at operation 703.

Although this disclosure has been described with an exemplary embodiment, various changes and modifications may be suggested to one skilled in the art. It is intended that this disclosure encompass such changes and modifications as fall within the scope of the appended claims.

What is claimed is:

1. A user equipment (UE), comprising:
   a transceiver configured to
      receive one or more Doppler pre-compensated control signals generated based on Doppler pre-compensation on control signals using a first of Doppler pre-compensation patterns,
      receive a signal indicating the Doppler pre-compensation patterns, and
      receive a Doppler pre-compensated data signal generated based on Doppler pre-compensation on a data signal using a second of the Doppler pre-compensation patterns; and
   a processor operably coupled to the transceiver, the processor configured to demodulate and decode the Doppler pre-compensated data signal based on the Doppler pre-compensation patterns.

2. The UE of claim 1, wherein the control signals are used to access a network in order to receive the data signal.

3. The UE of claim 1, wherein the control signals comprise one or more of a set of synchronization signals, a set of system information blocks (SIBs), a radio resource control (RRC) message, or a physical downlink control channel (PDCCH), and
   wherein the data signal comprises a physical downlink shared channel (PDSCH).

4. The UE of claim 1, wherein the signal indicating the Doppler pre-compensation patterns comprises one of a radio resource control (RRC) message or a physical downlink control channel (PDCCH), and
   wherein a downlink control information (DCI) received on the PDCCH indicates a time offset between the PDCCH and a physical downlink shared channel (PDSCH).

5. The UE of claim 1, wherein the signal indicating the Doppler pre-compensation patterns indicates one of absolute Doppler values or a difference between Doppler values.

6. The UE of claim 1, wherein the first Doppler pre-compensation pattern is applied to a set of synchronization signals, a set of system information blocks (SIBs), a radio resource control (RRC) message, and a physical downlink control channel (PDCCH), and wherein the second Doppler pre-compensation pattern is applied to a physical downlink shared channel (PDSCH).

7. The UE of claim 6, wherein one or more of the SIBs indicates the second Doppler pre-compensation pattern.

8. A method, comprising:

receiving one or more Doppler pre-compensated control signals generated based on Doppler pre-compensation on control signals using a first of Doppler pre-compensation patterns;

receiving a signal indicating the Doppler pre-compensation patterns;

receiving a Doppler pre-compensated data signal generated based on Doppler pre-compensation on a data signal using a second of the Doppler pre-compensation patterns; and demodulating and decoding the Doppler pre-compensated data signal based on the Doppler pre-compensation patterns.

9. The method of claim 8, wherein the control signals are used to access a network in order to receive the data signal.

10. The method of claim 8, wherein the control signals comprise one or more of a set of synchronization signals, a set of system information blocks (SIBs), a radio resource control (RRC) message, or a physical downlink control channel (PDCCH), and wherein the data signal comprises a physical downlink shared channel (PDSCH).

11. The method of claim 8, wherein the signal indicating the Doppler pre-compensation patterns comprises one of a radio resource control (RRC) message or a physical downlink control channel (PDCCH), and wherein a downlink control information (DCI) received on the PDCCH indicates a time offset between the PDCCH and a physical downlink shared channel (PDSCH).

12. The method of claim 8, wherein the signal indicating the Doppler pre-compensation patterns indicates one of absolute Doppler values or a difference between Doppler values.

13. The method of claim 8, wherein the first Doppler pre-compensation pattern is applied to a set of synchronization signals, a set of system information blocks (SIBs), a radio resource control (RRC) message, and a physical downlink control channel (PDCCH), and wherein the second Doppler pre-compensation pattern is applied to a physical downlink shared channel (PDSCH).

14. The method of claim 13, wherein one or more of the SIBs indicates the second Doppler pre-compensation pattern.

15. A base station (BS), comprising:

a processor configured to generate one or more Doppler pre-compensated control signals by performing Doppler pre-compensation on control signals using a first of Doppler pre-compensation patterns, and generate a Doppler pre-compensated data signal by performing Doppler pre-compensation on a data signal using a second of the Doppler pre-compensation patterns; and a transceiver operably coupled to the processor, the transceiver configured to transmit the one or more Doppler pre-compensated control signals and the Doppler pre-compensated data signal.

16. The BS of claim 15, wherein the transceiver is configured to transmit a signal indicating the Doppler pre-compensation patterns.

17. The BS of claim 15, wherein the control signals comprise one or more of a set of synchronization signals, a set of system information blocks (SIBs), a radio resource control (RRC) message, or a physical downlink control channel (PDCCH), and wherein the data signal comprises a physical downlink shared channel (PDSCH).

18. The BS of claim 15, wherein the signal indicating the Doppler pre-compensation patterns comprises one of a radio resource control (RRC) message or a physical downlink control channel (PDCCH), and wherein the PDCCH indicates a time offset between the PDCCH and a physical downlink shared channel (PDSCH).

19. The BS of claim 15, wherein the signal indicating the Doppler pre-compensation patterns indicates one of absolute Doppler values or a difference between Doppler values.

20. The BS of claim 15, wherein the first Doppler pre-compensation pattern is applied to a set of synchronization signals, a set of system information blocks (SIBs), a radio resource control (RRC) message, and a physical downlink control channel (PDCCH), wherein the second Doppler pre-compensation pattern is applied to a physical downlink shared channel (PDSCH), and wherein one or more of the SIBs indicates the second Doppler pre-compensation pattern.

* * * * *